United States Patent Office 3,238,636
Patented Mar. 8, 1966

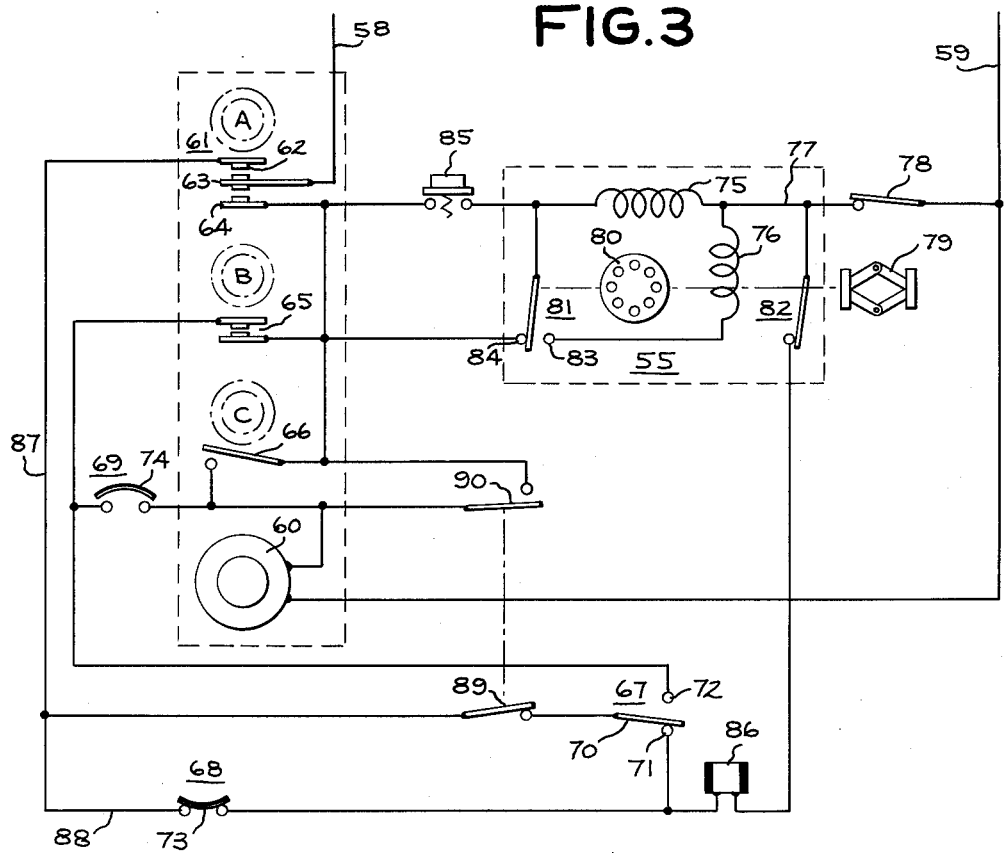

3,238,636
AUTOMATIC DRYER CONTROL SYSTEM
Glenn R. Chafee, Jr., Louisville, Ky., and Earl F. Pierce, Jr., Clarksville, Ind., assignors to General Electric Company, a corporation of New York
Filed Feb. 7, 1964, Ser. No. 343,336
3 Claims. (Cl. 34—45)

This invention relates to automatic clothes dryers, and more particularly to systems for dryers wherein termination of the drying operation is brought about primarily in response to the condition of the clothes.

It is an object of our invention to provide an automatic dryer control system wherein three thermostats are provided in particular cooperative relationship to a sequence control mechanism in order to provide for automatic termination of a clothes drying operation when the clothes are dry.

A further more specific object of our invention is to provide such a structure wherein the relationship of the thermostats and the sequence control mechanism is such that either high heat or low heat timed drying operations may also readily be provided, it being understood that some modern fabrics sometimes require special treatment other than the conventional automatic drying operation.

In carrying out our invention in one form thereof, we provide a fabric dryer in which a stream of air is circulated through conduit means into a drying chamber, and then out of the drying chamber. The air is heated prior to its entering the drying chamber so that it will dry damp fabrics in the chamber. Operation of the dryer is terminated by a timer after a predetermined period of timer operation; this timer also controls a timer switch which is opened after a second, and lesser, predetermined period of timer operation.

Three thermostatic means are provided. The first, responsive to the temperature of air entering the chamber, includes a first switch which is in a first position below a predetermined temperature and is moved to a second position above that predetermined temperature. The second thermostatic means has a second switch which is opened at a predetermined temperature of fabrics in the chamber, and the third thermostatic means is similar to the second, but closes a third switch at a predetermined temperature higher than that required to trip the second thermostatic means.

A circuit for causing operation of the heating means is provided and includes, in parallel, the first switch in its first position and the second switch. Also, a circuit for causing operation of the timer is provided which includes, in parallel, the first switch in its second position and the timer switch; in series with these two switches, there is provided the third switch.

With this arrangement the heater is under the dual control of the first and second thermostatic switches; the timer, in order to operate, requires the closure either of both the first and third thermostatic switches or else of the timer switch and the third thermostatic switch. It has been determined that this arrangement provides a highly effective automatic cycle wherein rapid drying is achieved during the initial portion of a cycle, and the termination of the operation is effected substantially under the control of the inlet temperature. The proper relationship of heater operation and timer operation is provided by virtue of the fact that these operations are alternative during the initial portion of a drying cycle, but may occur at the same time during the terminal portion of a cycle.

The subject matter which we regard as our invention is particularly pointed out and distinctly claimed in the concluding portion of this specification. Our invention, however, both as to organization and method of operation together with further objects and advantages thereof, may best be understood by reference to the following description taken in conjunction with the accompanying drawings.

In the drawings:

FIGURE 3 is a schematic illustration of our improved control arrangement; and

FIGURE 4 is a development of the surface of the cams shown in FIGURE 3, illustrating the operation of switches by the cams.

Figure 1:
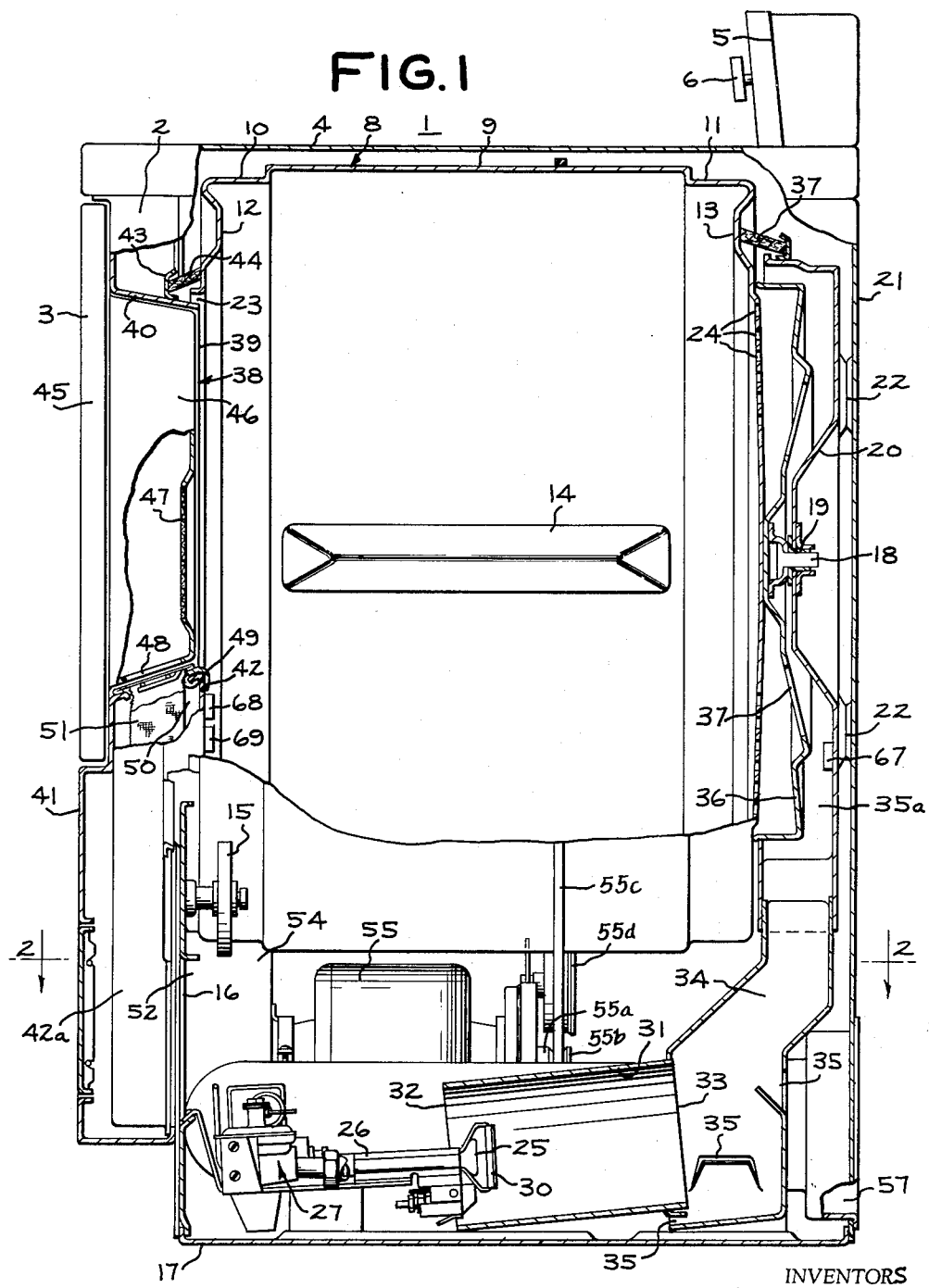
FIGURE 1 is a side elevational view of a gas clothes dryer incorporating our improved dryer control arrangement, the view being partly broken away and partly sectionalized to illustrate details.

Referring now to FIGURE 1, the machine illustrated is a domestic clothes dryer gnerally indicated by the numeral 1. Dryer 1 is provided in the usual way with a cabinet 2 having a front door 3 to provide access to the interior of the cabinet for loading or unloading clothes. Provided on the top wall 4 of cabinet 2 is a control panel 5 which may in the conventional way include suitable controls generally indicated at 6. Controls 6 are used to cause the machine to start and proceed through a desired cycle of operation, as will be further explained herebelow.

Within cabinet 2 there is provided a clothes tumbling container or drum 8 mounted for rotation on a substantially horizontal axis. Drum 8 is substantially cylindrical in shape, having a first cylindrical wall portion 9, second and third outer cylindrical wall portions 10 and 11 located respectively adjacent the front and back of the drum, a front wall 12, and a back wall 13. Outer wall portions 9, 10 and 11 are imperforate over their entire length so that the outer shell of the basket is imperforate. On the interior surface of central portion 9 there may be provided a plurality of clothes tumbling ribs 14 so that clothes are lifted up when the drum rotates and then tumble back down to the bottom of the basket.

The front of drum 8 may be rotatably supported within outer casing 2 by suitable idler wheels, one of which is shown by the numeral 15. These wheels are rotatably secured to the top of a member 16 which extends up from base 17 of the machine. Wheels 15 are disposed beneath the drum in contact with portion 10 thereof so as to support portion 10 on each side to provide a stable support. The rear end of drum 8 receives its support by means of a stub shaft 18 extending from the center of wall 13. Shaft 18 is secured within a bearing 19 formed in a baffle-like member 20 which in turn is rigidly secured to the back wall 21 of cabinet 2 by any suitable means such as, for instance, welding at a number of points 22. With the arrangement shown, the basket may rotate on a horizontal axis, with rollers 15 providing the front support and stub shaft 18 within bearing 19 providing the rear support.

In order to provide for the flow of a stream of drying air through the clothes drum, the drum is provided with a central aperture 23 in its front wall 12 and with an opening in the form of a plurality of perforations 24 in its rear wall 13. The perforations in the present case are formed to extend around the rear wall in an annulus.

Dryer 1 is of the type which provides heated air to the interior of drum 8 through perforations 24. The air is heated by a gas flame which issues from the outlet 25 of a conventional inshot burner 26. Burner 26 receives a regulated supply of gas from a controlling valve assembly 27 of the type conventionally used in gas operated clothes dryers, the gas being supplied to assembly 27 through a pipe 28 connected to an appropriate source (not shown) of gas. In the conventional way, primary air is drawn into the burner at the inlet end 29 thereof, and combustion occurs as a result of the mixing of this primary air with gas and its ignition by an appropriate pilot flame (not shown). The gas flame is then spread out, by a suitable member 30 positioned just beyond the outlet end of the burner, within a combustion chamber 31 so that secondary air drawn in through end 32 of chamber 31 is heated to a high temperature.

The outlet end 33 of chamber 31 communicates with an upwardly extending duct 34 which is provided with additional air openings 35, as needed, in order to reduce the temperature of the air and gas mixture to an appropriate extent. The heated mixture (hereinafter called heated air) then flows up through duct 34, and enters a generally circular heat diffuser chamber 35a formed between member 20 and a baffle 36 which is rigidly secured to the outer surface of wall 13. Baffle 36 has openings 37 formed therein so that the heated air may flow from chamber 35a through openings 37 and perforations 24 into the drum 8.

It will readily be observed that the combustion chamber 31, duct 34, chamber 35a, openings 37 and perforations 24 form inlet conduit means for the heated air. Leakage of this heated air between member 20 and the moving drum 9 may be prevented by use of a suitable ring seal 37, preferably formed of felt-like material, which is secured to member 20 in sealing relationship with the exterior surface of drum wall 13. This ring seal 37 extends in a complete circle, except where duct 34 connects with chamber 35a.

The front opening 23 of the drum is substantially closed by means of a stationary bulkhead generally indicated by the numeral 38. Bulkhead 38 is made up of a number of adjacent members including the inner surface 39 of access door 3, a stationary frame 40 for the door formed as a flange of front wall 41 of the cabinet, the inner surface member 42 of an exhaust duct which is formed by the cooperation of member 42 with a member 42a, and an annular flange 43 mounted on frame 40 and on the duct wall. It will be noted that a suitable clearance is provided between the inner edge of the drum opening 23 and the edge of bulkhead 38 so that there is no rubbing between the drum and the bulkhead during rotation of the drum. In order to prevent any substantial air leakage through opening 23 between the interior and the exterior of the drum, a suitable ring seal 44, preferably formed of felt-like material, is secured to flange 43 in sealing relationship with the exterior surface of drum wall 12.

Front opening 23, in addition to serving as part of the air flow path through the drum, also serves as a means whereby clothes may be loaded into and unloaded from the drum. Door 3 whose inner surface forms part of the bulkhead closing the opening is mounted on cabinet 2, so that when the door is opened clothes may be inserted into or removed from the drum through the door frame 40. It will be noted that the door includes an outer flat imperforate section 45 and an inwardly extending hollow section 46 mounted on the flat outer section. Hollow section 46 extends into the door frame 40 when the door is closed, and the door surface 39 which comprises part of the combination bulkhead 38 is actually the inner wall of the hollow section.

The air outlet from the drum is provided by a perforated opening 47 formed in the inner wall 39 of hollow door section 46. The bottom wall section of door 3 and the adjacent wall of door frame 40 are provided with aligned openings 48 and 49, opening 49 providing the entrance to the duct 50 formed by the cooperation of members 42 and 42a. As shown, a lint trap 51, which may comprise a fine mesh bag, is preferably positioned in the exhaust duct 50 at opening 49, the bag being supported by the door frame 40.

Figure 2:
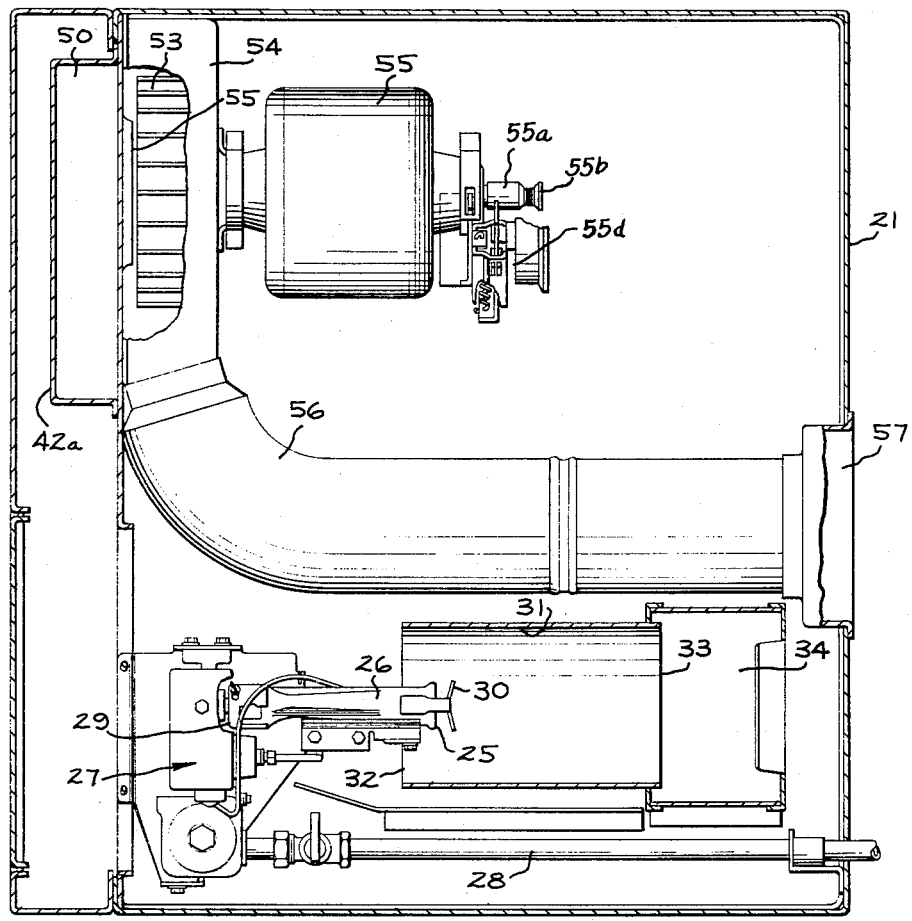
FIGURE 2 is a cross-sectional view along line 2—2 in FIGURE 1.

Duct 50 leads downwardly to an opening 52 formed in the member 16 which supports wheels 15. Opening 52 constitutes the inlet to a blower member 53 (FIGURE 2) contained within a housing 54 and directly driven by an electric motor 55. The blower draws ambient air in through the inlet conduit system as described, then through the basket, then through the drum 3 and the duct 50, and then into the blower. From the blower, the air passes through an appropriate outlet duct 56 to an opening 57 provided in the rear wall 21 of the cabinet so that the air is exhausted from the machine. It will be understood that an appropriate vent to the exterior of a building may be connected to opening 57 if so desired.

In addition to driving blower 53, motor 55 constitutes the means for effecting rotation of drum 8. In order to effect this, motor 55 is provided with a shaft 55a having a small pulley 55b formed at the end thereof. A belt 55c extends around pulley 55b and also entirely around the cylindrical wall section 9 of drum 8. The relative circumferences of pulley 55b and wall section 9 cause the drum to be driven by the motor at a speed suitable to effect tumbling of the clothes therein. In order to effect proper tensioning of belt 55c, there may be provided a suitable idler assembly 55d. Thus, the air is pulled through the drum and at the same time the fabrics in the drum are tumbled. When the air is heated within combustion chamber 31, the heated air which then passes through the drum causes vaporization of moisture from the clothes. The vapor is carried off with the air as it passes out of the machine.

The operation of dryer 1 is controlled by the system shown in FIGURE 3. As shown there, the entire control system of the machine is energized across a conventional power supply system including a pair of supply conductors 58 and 59. For domestic use, these conductors will normally be connected across a 110 volt 60 cycle alternating current power supply (not shown). The control system includes a timer motor 60 which is in controlling relation to cams A, B and C. Cam A in turn controls a timer operated switch 61 provided with contacts 62, 63 and 64. Cam B controls a switch 65, and cam C controls a switch 66. The timer motor, the cams, and their switches together comprise sequence control means of the type conventionally used in appliances such as clothes dryers.

Our improved control system also includes three thermostats 67, 68 and 69. Thermostat 67, as shown in FIGURE 1, is located in the heat diffuser chamber 35a so as to sense the temperature of air about to enter the drum 9. Returning to FIGURE 3, it will be seen that thermostat 67 includes a switch 70 having a first position in which it engages a contact 71 and a second position in which it engages a contact 72. Normally switch 70 is closed with contact 71, but when a predetermined temperature (in the present case, on the order of 180° F.) is reached the switch 70 is moved into engagement with contact 72 until the temperature again decreases, at which time it moves back into engagement with contact 71. Thermostat 67 is thus effective to conrol the temperature of the air delivered for drying purposes to drum 9, maintaining it approximately at the trip temperature of switch 70, that is, around 180°.

Thermostat 68 is positioned so as to sense the temperature of fabrics in drum 8. It has been found that positioning thermostat 68 adjacent air outlet 47 from the drum as shown, that is, by placing it on the wall of duct 50 just below the access door opening, a temperature is sensed by the thermostat 68 which is essentially proportional to the temperature of fabrics in the drum. This is the result both of actual physical contact of the fabrics with the thermostat and of the flow of air over the thermostat after it has contacted the fabrics. Thermostat 68 includes a normally closed switch 73 which opens at an appropriate temperature. For purposes of illustration, in the present machine this temperature may be assumed to be on the order of 130° F.

The third thermostat 69 is positioned similarly to thermostat 68 so that it will also react to fabric temperature. However, thermostat 69 is designed to trip at about 140° F., that is, at a somewhat higher temperature than thermostat 68. In addition, thermostat 69 has a normally open switch 74 which moves to its closed position when the thermostat trips. Thermostats 68 and 69, because they respond to clothes temperature, tend to operate as though they were larger masses than thermostat 67. In other words, the clothes mass causes slower charges in the temperature sensed by thermostats 68 and 69, as compared to the quick changes in the air temperature only that are sensed by thermostat 67.

It will be understood that these three thermostats may, for the sake of economy, be of a relatively simple bimetallic type wherein the switch and the thermostat itself are provided by the same structure. However, it is also readily conceivable that, in any one or all of the thermostats, a conventional bulb-type thermostat may be used together with a switch actuated by differences in the pressure within the bulb.

Motor 55 is connected through contacts 64 and 63 to conductor 58 at one side thereof, and to conductor 59 at the other side thereof. The motor is conventionally of the single phase induction type, having a main winding 75 and a start winding 76 both connected at a common end to a conductor 77 including a conventional door switch 78 (which is closed when door 3 is closed and is opened when the door is opened). Conductor 77 is connected to conductor 59.

Start winding 76 is connected in parallel with main winding 75 under the control of a speed responsive device, such as that shown at 79, which is schematically shown as connected to the rotor 80 of the motor. The speed responsive device 79 controls a pair of switches 81 and 82. Switch 81 is engaged with contact 83 when the machine is at rest and moves into engagement with contact 84 as the motor comes up to speed. It can readily be seen that engagement with contact 83 connects the start winding 76 in parallel with main winding 75, and that movement of switch 81 away from this position opens the start winding. Thus, as rotor 80 comes up to speed the start winding becomes de-energized and the motor then continues to run on the main winding 75 alone. The other centrifugally operated switch 82 is normally open, and is moved from an open position to a closed position as the motor comes up to speed.

Starting of the motor is provided by a manually operable switch 85. Switch 85 connects the motor, through switch 61, to conductor 58 and is normally biased to the open position shown. When switch 85 is manually maintained closed, energization of the motor is provided, and within less than a second, then, under normal circumstances, the motor comes up to speed so that switch 81 engages contact 84. As a result of this movement of centrifugally operated switch 81, the main winding 75 of motor 55 continues to be energized by a bypass around switch 85 and thus, when manual closure of the switch 68 ceases and the switch opens, a bypass is provided around it.

The valve assembly 27 which, of course, controls the provision of heat, includes a main solenoid schematically shown in FIGURE 3 by the numeral 86. When solenoid 86 is energized, the main flow of gas will occur so that air will be heated; when this main solenoid is de-energized. no heating of the air passing through drum 8 will be provided. Solenoid 86 thus represents a specific component of the heating means which is included in the control circuit of FIGURE 3 and which determines when heating of the air entering drum 8 will be provided.

An energizing circuit for this solenoid is provided, starting at conductor 58, and passing through contacts 63 and 62 of switch 61 to conductor 87. From conductor 87 there are two parallel paths through which the solenoid 86 may be reached. One of them is through the conductor 88 which includes the switch 73 of thermostat 68. The other path, directly in parallel with switch 73, includes a manually operated switch 89 and switch 70 of thermostat 67 when it is in engagement with contact 71. Through either one of these paths then, the circuit for causing operation of the heating means is completed from conductor 87 through to the solenoid 86, and then from solenoid 86 through switches 82 and 78 back to conductor 59.

An energizing circuit for operating timer motor 60 is provided. This circuit, starting at conductor 58, may then proceed through either one of two alternative paths to the timer motor during an automatic cycle of operation. One of these paths is completed through switch 61 to switch 65, and then through switch 74 of thermostat 69 to the timer motor. The other path extends through conductor 87, manual switch 89, switch 70 of thermostat 67 when it engages contact 72, switch 74, and timer motor 60. From the timer motor, the circuit is then completed as before to conductor 59.

Completing the description of the system of FIGURE 3, a switch 90 is closed at the same time that switch 89 is opened. When switch 90 closes, it completes an energizing circuit for the timer motor 60 independently of either switch 65 or switch 70. In addition, when switch 66 closes (which does not happen at all in automatic drying operations) it also completes an energizing circuit for the timer motor independently of either switch 65 or switch 70.

To illustrate the functioning of our improved system, a brief description will now be provided of the sequence of events when a relatively large, heavy load of wet fabrics is inserted and the machine is set for automatic drying. When this occurs, as will be seen from FIGURE 4, all three contacts of switch 61 are closed, and switch 65 is open. Switch 89 is closed and switch 90 is open. Since the machine is cool, switch 73 is closed, switch 70 engages contact 71, and switch 74 is open. Thus, when switch 85 is manually closed, the motor will come up to speed thereby commencing tumbling rotation of drum 8 and movement of air by a blower 53.

When switch 82 closes, it completes the energizing circuit for solenoid 86; in fact, the circuit is completed through both parallel paths since switch 73 is closed and switch 70 engages contact 71. Consequently, the gas will flow and will be mixed with air and ignited so as to heat the air being moved by blower 53 through the drum. The temperature of the incoming air will rise to 180° F. quite rapidly, at which time thermostat 67 will move switch 70 into engagement with contact 72. However, since the clothes at this point will still be almost as wet as when they were put in, switch 73 will still be closed and switch 74 will still be open.

As long as this state of affairs continues, the heat will continue to be supplied to the clothes because switch 73 is closed, and the timer will not operate because switch 74 is open. This is precisely the desired effect, inasmuch as with a heavy load of wet clothes, as much drying energy should be provided to the clothes as is possible and this is exactly what is taking place: the heat energy is being provided on a continuous basis, rather than permitting its interruption under the control of the switch 67.

Eventually, the low temperature fabric sensing thermostat 68 will trip and its switch 73 will be opened. At this time, the heat input will be under the control of the thermostat 67, that is, the inlet temperature will be cycled about 180° F., control having passed from the thermostat 68 to the thermostat 67 as long as switch 73 is open. With the heavy load which has been assumed, the heating will continue on this intermittent basis for a period of time under the joint control of thermostats 67 and 68. While thermostat 68 opens switch 73 at 130° F., the fact that thermostat 67 may permit heating to take place notwithstanding thermostat 68 means that the temperature will slowly be raised from the 130° at which thermostat 68 trips to the 140° at which thermostat 69 trips.

At this point, with a heavy load the timer switch 65 is open; therefore, for the timer motor to be energized, not only must thermostat 69 be closed, but switch 70 must engage contact 72. Because of the relatively rapid temperature changes sensed by thermostat 67, this means that the timer will be energized only intermittently, under the control of thermostat 67, until eventually the point is reached at which timer operated switch 65 closes. At this time, notwithstanding the tripping and resetting of thermostat 67, the timer will continue to run through switch 79 of the thermostat 69 because of the closure of timer switch 65, thermostat 69 acting as though it had a larger mass and a slower response because it is affected by the clothes which change temperature relatively slowly.

At the end of the predetermined period of timer operation, all three contacts of switch 61 will open to terminate operation of the machine. Thus, an automatic drying cycle of a heavy load includes the following: initial continuous operation of the heating means through either or both of the parallel circuits provided. This is then folfollowed by intermittent operation of the heating means, after thermostat 68 trips under the control of thermostat 67 through to the end of the drying operation.

As to the timer, initially it does not operate at all; then after thermostat 69 is tripped, the timer is operated, intermittently at first under the control of thermostat 67, and then continuously. It will be observed that toward the end of the operation the timer and the heat may be provided simultaneously. Also, at times during intermediate portions of the cycle there may be no heat provided at all. For instance, after thermostat 68 has tripped but before thermostat 69 has tripped; when thermostat 67 is in its tripped position, neither the heat nor the timer will be in operation. It has been found that this system provides a highly effective and accurate automatic drying cycle wherein the desired degree of dryness of the clothes is achieved when the machine finally shuts off.

With automatic drying of smaller loads, for instance with a delicate load, all aspects of the cycle are the same with the single exception that because timer switch 65 is closed from the start of the operation the timer will operate continuously once it is tripped (provided thermostat 69 remains tripped as is generally the case). This too has been found to provide the desired compensation and the needed difference in the manner of operation for heavy loads and delicate loads. Thus, the cooperative relationship of the thermostats with the timer switches provides, in a novel way, the desired goal.

In addition to the foregoing, the circuitry described facilitates the provision of both low-heat and high-heat timed operations of the type sometimes required by modern synthetic fabrics. For a low-heat timed operation, an appropriate manual control is operated to cause simultaneously opening of switch 89 and closing of switch 90. The closing of switch 90 insures that, for whatever time is selected, the timer motor will run continuously until it opens switch 61 to end the operation. The opening of switch 89 insures that the operation of the heater will be under the exclusive control of thermostat 68, that is, the temperature of the fabrics is maintained at a relatively low level.

If the fabrics are to be permitted to reach a higher temperature in a timed operation, then switches 89 and 90 are returned to the position shown in FIGURE 3, and timer switches 61 and 66 are closed. The closure of switch 66 insures continuous operation of the timer motor for the desired length of time, after which both switches are opened to end the operation. The closure of switch 89 permits the temperature to rise above the relatively low temperature which would be the maximum permitted if thermostat 68 were in exclusive control.

Thus, different cycles are readily achieved with our improved control circuit.

While in accordance with the patent statutes we have described what at present is considered to be the preferred embodiment of our invention, it will be obvious to those skilled in the art that various changes and modifications may be made therein without departing from the invention, and it is therefore aimed in the appended claims to cover all such equivalent variations as fall within the true spirit and scope of our invention.

What we claim as new and desire to secure by Letters Patent of the United States is:

1. A fabric dryer comprising:
   (a) a drying chamber having first and second openings;
   (b) inlet conduit means connected to said first opening;
   (c) means for circulating a stream of air from said conduit means to said first opening and through said chamber to said second opening;
   (d) heating means for heating the air in said conduit means so as to dry damp fabrics in said chamber;
   (e) a timer for terminating operation of said dryer after a predetermined period of timer operation;
   (f) a timer switch opened by said timer after a second lesser predetermined period of timer operation;
   (g) first thermostatic means responsive to the temperature of air entering said chamber, said first thermostatic means including a first switch having a first position below a first predetermined temperature and a second position above said first predetermined temperature;
   (h) second thermostatic means including a second switch and arranged to open said second switch at a second predetermined temperature of fabrics in said chamber;
   (i) third thermostatic means including a third switch and arranged to close said third switch at a third predetermined temperature of fabrics in said chamber higher than said second predetermined temperature;
   (j) a circuit for providing operation of said heating means including in parallel said first switch in its first position and said second switch;
   (k) and a circuit for providing operation of said timer including said first switch in its second position and said timer switch in parallel, and said third switch in series therewith.

2. The fabric dryer defined in claim 1 wherein said second and third thermostatic means are both positioned adjacent said second opening of said drying chamber.

3. The fabric dryer defined in claim 1 wherein first and second additional manual switches are provided for effecting a timed drying operation at low heat, said first additional switch being positioned in series with said first switch, said second additional switch forming a bypass timer operating circuit around said previously mentioned circuit for providing operation of said timer, said first additional switch being opened and said second additional switch being closed during a low-heat timed operation, said first additional switch being closed and said second additional switch being open during other drying operations.

No references cited.

WILLIAM F. O'DEA, *Primary Examiner.*